UNITED STATES PATENT OFFICE.

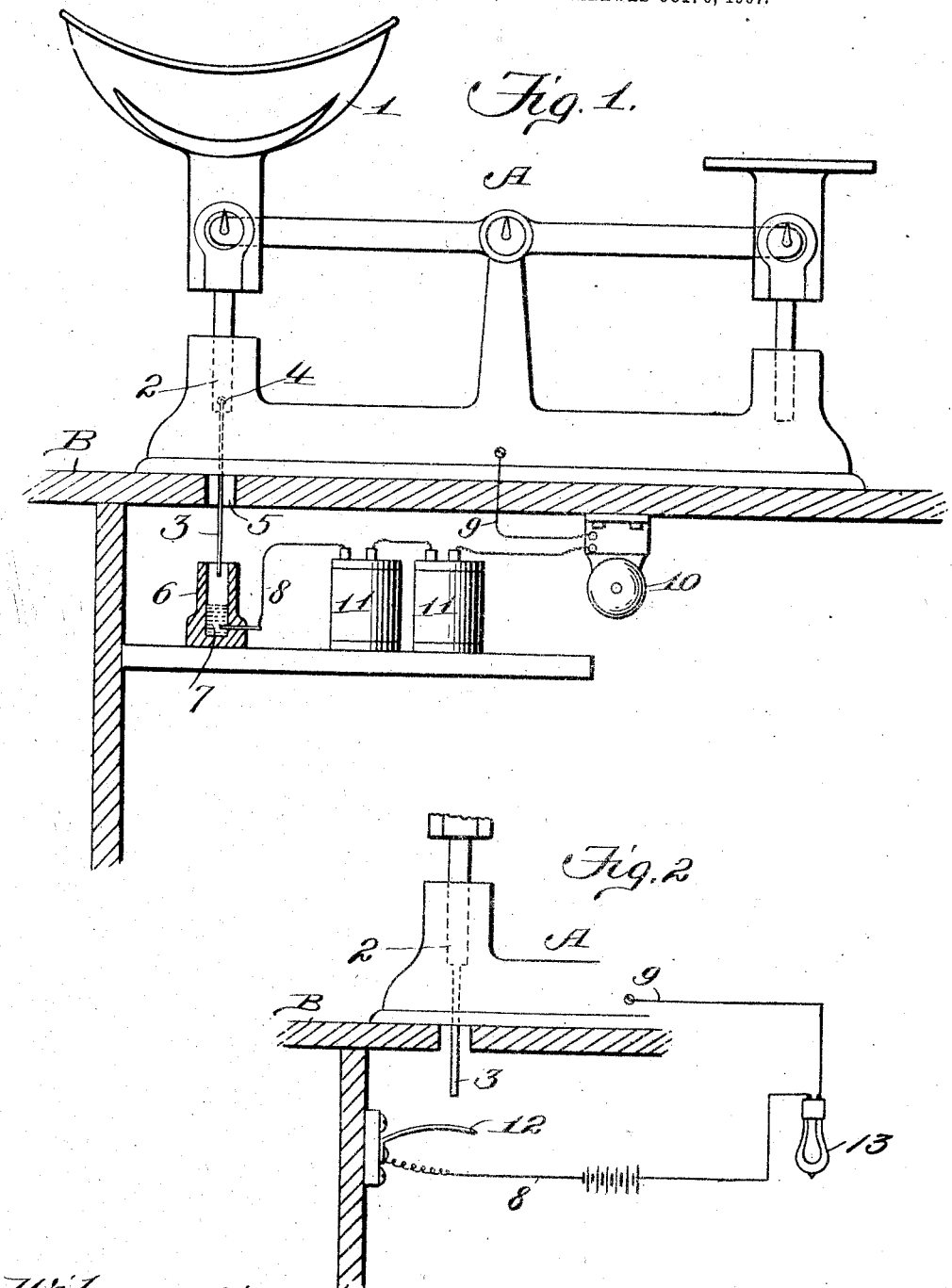

CLARENCE W. McKEE, OF PHŒNIX, ARIZONA TERRITORY.

WEIGHING-SCALE.

No. 881,020.  Specification of Letters Patent.  Patented March 3, 1908.

Application filed February 28, 1906, Serial No. 303,521. Renewed October 5, 1907. Serial No. 396,057.

*To all whom it may concern:*

Be it known that I, CLARENCE W. McKEE, a citizen of the United States, residing at Phœnix, in the county of Maricopa and Territory of Arizona, have invented new and useful Improvements in Weighing-Scales, of which the following is a specification.

This invention relates to weighing scales and is an improvement on the weighing scales described in United States Letters Patent Nos. 762,187, issued June 7, 1904, and 793,537, issued June 27, 1905.

The object of the invention is in a ready, simple, thoroughly efficient and practical manner and by audible means to notify a purchaser when correct weight has been given and to prevent over-weighing with consequent loss to the seller; and furthermore to obviate friction between the operative parts of the mechanism, thereby preventing any interference with the correct operation of the scales.

With the above and other objects in view which will appear as the nature of the invention is better understood, the invention consists, generally stated, in a signaling device for weighing scales embodying in its construction a contact movable with a pan support, and a make-and-break device supported by a fixed part below the body of the scale, comprising a cup or holder to contain a body of mercury or other suitable liquid to be engaged by the contact when the pan support descends, the said contact and mercury holder being in circuit with a source of electrical energy, including a bell or other means for giving an audible signal.

The invention consists, further, in the novel construction, combination and arrangement of parts of a signaling device for scales as will be hereinafter more fully described and claimed.

In the accompanying drawings forming part of this specification, and in which like characters of reference indicate corresponding parts, there is illustrated a form of embodiment of the invention, as shown in Figure 1, capable of carrying the same into practical operation, and in Fig. 2 is shown a slightly modified form of the invention.

It is to be understood that the elements herein exhibited may be varied or changed as found desirable, as come properly within the scope of the claims hereunto appended, without departing from the spirit of the invention In the drawings, the letter A designates an ordinary balance-beam weighing scale having combined therewith the improvements, but it is to be understood that the invention is not limited to this form of scale alone as the improvements are equally adaptable to other forms and may be applied thereto without departing from the spirit of the invention.

The scale is herein shown as resting upon a counter B, the same not forming any part of the invention, but merely shown to facilitate the understanding thereof, as the device can be sold as an article of manufacture and attached to any ordinary form of support. The signaling device is placed beneath the counter B to prevent it from being tampered with by unauthorized persons. The pan support 1 of the scale has an extension 2 which is adapted to be engaged by a rod or plunger 3, said rod having engagement with the extension 2 by means of a flexible joint 4 and being adapted to move through an opening 5 in the counter B. At a suitable point under the counter B and the scale A is fixed a holder or cup 6 containing a body of mercury 7, or other suitable liquid, the level of which in the cup will be sufficiently removed from the upper end thereof to permit the said rod or plunger 3 to move the proper distance downward before emerging in or contacting with said body of mercury 7 to insure down weight; but in the event of overweight the said rod or plunger 3 will be forced into the body of mercury 7, or other suitable liquid, and by remaining therein cause a continuous sounding of the alarm or signal until the overweight has been removed.

Connected to the cup or holder 6 and plunger or rod 3, at any desired locality, are conductors 8 and 9 respectively constituting a circuit in which is included an ordinary electric bell 10, the terminals of the circuit being connected with a suitable source of electrical energy, such as a plurality of dry cells 11, 11, as clearly shown. It will be apparent that when the scales are in operation after a correct amount of material has been placed on the pan support 1, said pan support will be caused to move downward a distance without forcing the rod or plunger 3 into the body of mercury 7, or other suitable liquid, and should it be that a surplus amount of material is added, the said pan support 1 will have a further downward movement, thereby bringing the free end of the rod or plunger 3 into the body of mercury 7, or other suitable liquid, thus making a contact and completing the circuit; and until the surplus amount of material is removed from the pan support 1 a continuous sounding of the alarm or signal will be audible.

In Fig. 2 I have shown a modified construction, which discloses a spring contact member 12 suitably fixed in a position below the counter B for engagement with the rod or plunger 3 and when so engaged capable of forming a complete circuit and having the same function as the device employed in Fig. 1.

The devices of this invention are exceedingly simple in construction and will be found thoroughly efficient and durable for the purpose designed, and will not be liable to damage or derangement in use. If, however, the parts should become disconnected they are easily accessible and can be rendered operative by replacement.

It will be apparent that I may substitute a visible signal as at 13 in Fig. 2 for the audible signal if found desirable.

Having thus described the invention, what I claim is:—

In a weighing scale having a movable pan support provided with a depending extension, a plunger loosely mounted on the latter and having a contact terminal, the latter projecting below the base of the scale, a yieldable element independent of the scale and arranged within the path of the contact terminal and normally out of contact therewith and adapted to be engaged thereby for completing an electrical circuit, an electric circuit, and a signaling device arranged within the circuit said yieldable element being below the plane of the scale base.

In testimony whereof I have hereunto set my hand in presence of two subscribing witnesses.

CLARENCE W. McKEE.

Witnesses:
C. E. McKEE,
BEATRICE WILLISCROFT.